United States Patent
Zweigle et al.

(10) Patent No.: US 12,289,344 B2
(45) Date of Patent: Apr. 29, 2025

(54) CYBERSECURITY IN ELECTRIC POWER SYSTEMS

(71) Applicant: Schweitzer Engineering Laboratories, Inc., Pullman, WA (US)

(72) Inventors: Gregory C. Zweigle, Pullman, WA (US); Eric J. Hewitt, Moscow, ID (US); Matthew J. Halladay, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 343 days.

(21) Appl. No.: 18/046,671

(22) Filed: Oct. 14, 2022

(65) Prior Publication Data

US 2024/0129339 A1  Apr. 18, 2024

(51) Int. Cl.
*H04L 29/06* (2006.01)
*H04L 9/40* (2022.01)

(52) U.S. Cl.
CPC ............ *H04L 63/20* (2013.01); *H04L 63/105* (2013.01); *H04L 63/164* (2013.01)

(58) Field of Classification Search
CPC ... H04L 63/20; H04L 63/164; H04L 63/0263; H04L 63/0281; H04L 63/105; H04L 63/10
USPC ............................................................ 726/1
See application file for complete search history.

(56) References Cited

U.S. PATENT DOCUMENTS

| | | | | |
|---|---|---|---|---|
| 9,406,094 | B2 | 8/2016 | Kearns | |
| 9,917,442 | B2 | 3/2018 | Beauregard | |
| 10,021,072 | B2* | 7/2018 | Ishigaki | H04L 63/0281 |
| 11,518,255 | B2* | 12/2022 | Kohn | G05B 17/02 |
| 2015/0311721 | A1 | 10/2015 | Uppal | |
| 2020/0371540 | A1 | 11/2020 | Kearns | |

OTHER PUBLICATIONS

Chee-Wooi Ten, Govindarasu Manimaran, Chen-Ching Liu, "Cybersecurity for Critical Infastructures: Attack and Defense Modeling" IEEE Transactions on Systems, Man, and Cybemetics—Part A: Systems and Humans, vol. 40, No. 4, Jul. 2010.
Peter Firstbrook, et. al. "Top Trends in Cybersecurity 2022" Gartner. Feb. 18, 2022.

(Continued)

*Primary Examiner* — Longbit Chai
(74) *Attorney, Agent, or Firm* — Jared L. Cherry

(57) ABSTRACT

Disclosed herein are systems, devices, and methods for improving cybersecurity in electric power systems. In one embodiment, a local controller configured for use in an electric power system may include a measurement subsystem to receive a plurality of conditions related to electrical conditions in a microgrid. A communication subsystem may communicate a set of data related to conditions in the microgrid to a remote controller; and receive a plurality of requests for control actions from the remote controller. An analysis subsystem may generate an assessment of the plurality of requests for control actions in relation to the plurality of conditions related to electrical conditions in the microgrid and identify a subset of the plurality of requests for control actions from the remote controller for execution based on the assessment. A control action subsystem may then issue a control action to an asset in the microgrid.

20 Claims, 7 Drawing Sheets

(56) References Cited

OTHER PUBLICATIONS

"The Future of Electric Power in the United States" National Academies of Sciences, Engineering, and Medicine., The National Academies Press. 2021. https://doi.org/10.17226/25968.

22nd Annual Global Automative Executive Survey 2021. KPMG. Nov. 2021.

Joe Loughry, David A. Umphress "Information Leakage from Optical Emanations" ACM Transactions on Information and System Security, vol. 5, No. 3, Aug. 2002.

IEEE Draft Guide for Distributed Energy Resources Management Systems (DERMS) Functional Specification. IEEE. Feb. 2021.

Western Energy Imbalance Market Benefits Report First Quarter 2022. California ISO, Apr. 2022.

Mirrored Bits® Communications, Schweitzer Engineering Laboratories, Inc. Jun. 2018.

Mehul Joshi, et al. "Integrated Power Management and Protection System for a Remotely Located Islanded Facility" Presented at the 48th Annual Western Protective Relay Conference Oct. 2021.

Kendall E. Nygard, et al. "Decision Support Independence in a Smart Grid" Energy 2012: The Second International Conference on Smart Grids, Green Communications and IT Energy-Aware Technologies, Mar. 2012, pp. 69-74, IARIA.

A. Arulampalam et al. "Control of power electronic interfaces in distributed generation Microgrids." Journal. Sep. 2004. pp. 503-523. vol. 91. Taylor & Francis Ltd.

Advenica. "SecuriCDS Zone Guard Platform." Informational Sheet. Oct. 2017.Advenica AB.

Waterfall. "Flip." Product Brochure. Jul. 2018. Waterfall Security Solutions Ltd.

Opswat. "Security Gateway Solutions Powering Risk-Free IT-OT Communications." Jan. 2022. OPSWAT Inc.

Arbit. "Arbit Trust Gateway." Paper. May 20, 2019. pp. 1-4. Whitepaper.

Infodas. "SDoT Security Gateway & Security Gateway Express." retrieved on Dec. 30, 2022 from https://www.infodas.com/en/products/sdot_cross_domain_solutions/security-gateway-ieg-guard/.

Binary Armor. "SCADA Network Guard Info Sheet." Dec. 2020. Sierra Nevada Corporation.

Terafence. "TF MBsecure+." Terafence Ltd. Retrieved on Feb. 24, 2022 from https://terafence.com/product/terafence-mbsecure/#.

Trimark. "Trimark SCADA integration." Jul. 2019. Information Sheet. Trimark Associates, Inc.

Transmission and Distribution Committee of the IEEE Power and Energy Society. "IEEE Guide for Distributed Energy Resources Management Systems (DERMS) Functional Specification." Apr. 29, 2021. The Institute of Electrical and Electronics Engineers, Inc.

Mark Apperley, et al. "Grid-Lite: A Network Integrated Semi-autonomous Local Area Electricity System" Proceedings of the Fouth International Conference on Green IT Solutions, Jul. 6, 2015, pp. 27-33, SCITEPRESS—Science and Technology Publications.

S. Sridhar, A. Hahn, and M. Govindarasu, "Cyber-Physical System Security for the Electric Power Grid," in Proceedings of the IEEE, vol. 100, No. 1, pp. 210-224, Jan. 2012.

L. Piètre-Cambacédès, M. Tritschler and G. N. Ericsson, "Cybersecurity Myths on Power Control Systems: 21 Misconceptions and False Beliefs," in IEEE Transactions on Power Delivery, vol. 26, No. 1, pp. 161-172, Jan. 2011.

S. McLaughlin et al., "The Cybersecurity Landscape in Industrial Control Systems," in Proceedings of the IEEE, vol. 104, No. 5, pp. 1039-1057, May 2016.

S. V. Kartalopoulos, "NIS03-2: Optical Network Security: Sensing Eavesdropper Intervention," IEEE Globecom 2006.

Quan Zhou, et al."Cross-Layer Distributed Control Strategy for Cyber Resilient Microgrids," IEEE Transactions on Smart Grids, 2021.

Mohammadreza F.M. Arani, et al "Modeling and Simulation of the Aurora Attack on Microgrid Point of Common Coupling," 2019 7th Workshop on Modeling and Simulation of Cyber-Physical Energy Systems.

Ahmed Saad, et al "On the Implementation of IoT-Based Digital Twin for Networked Microgrids Resiliency Against Cyber Attacks," IEEE Transactions on Smart Grids, vol. 11, No. 6, Nov. 2020.

Suman Rath, et al "A Cyber-Secure Distributed Control Architecture for Autonomous AC Microgrid," IEEE Systems Journal, vol. 15, No. 3, Sep. 2021.

Zhiyi Li, Mohammad Shahidehpour, Farrokh Aminifar , "Cybersecurity in Distributed Power Systems," Proceedings of the IEEE, vol. 105, No. 7, Jul. 2017.

Hal Berghel, "A Farewell to Air Gaps, Part 1," Computer, IEEE Computer Society, vol. 48, No. 6, pp. 64-68, Jun. 2015.

Hal Berghel, "A Farewell to Air Gaps, Part 2," Computer, IEEE Computer Society, vol. 48, No. 7, pp. 59-63, Jul. 2015.

Ralph Langner, "Stuxnet: Dissecting a Cyberwarfare Weapon," in IEEE Computer and Reliability Societies vol. 9, No. 3, pp. 49-51, May-Jun. 2011.

Mordechai Guri, Boris Zadov, and Yuval Elovici, "Odini: Escaping sensitive data from faraday-caged, air-gapped computers via magnetic fields," IEEE Transactions on Information Forensics and Security, vol. 15, 2020.

Prashanth Krishnamurthy, et al., "Process-aware covert channels using physical instrumentation in cyber-physical systems," IEEE Transactions on Information Forensics and Security, vol. 13, No. 11, pp. 2761-2771, Nov. 2018.

J. Hu, S. You, M. Lind, and J. Østergaard, "Coordinated Charging of Electric Vehicles for Congestion Prevention In the Distribution Grid," in IEEE Transactions on Smart Grid, vol. 5, No. 2, pp. 703-711, Mar. 2014.

Xinghuo Yu and Yusheng Xue, "Smart Grids: A Cyber-Physical Systems Perspective," in Proceedings of the EEE, vol. 104, No. 5, pp. 1058-1070, May 2016.

D. Pliatsios, P. Sarigiannidis, T. Lagkas and A. G. Sarigiannidis, "A Survey on SCADA Systems: Secure Protocols, Incidents, Threats and Tactics," in IEEE Communications Surveys & Tutorials, vol. 22, No. 3, pp. 1942-1976, Third Quarter 2020.

R. W. Waldele, "Tales of Power System Failures: A Look at the Unusual, Strange, and Downright Bizarre Causes," in IEEE Power and Energy Magazine, vol. 14, No. 6, pp. 18-23, Nov.-Dec. 2016.

X. Li, X. Liang, R. Lu, X. Shen, X. Lin, and H. Zhu, "Securing smart grid: cyber-attacks, countermeasures, and challenges," in IEEE Communications Magazine, vol. 50, No. 8, pp. 38-45, Aug. 2012.

L. Williams, G. McGraw, and S. Migues, "Engineering Security Vulnerability Prevention, Detection, and Response," in IEEE Software, vol. 35, No. 5, pp. 76-80, Sep./Oct. 2018.

K. G. Ravikumar, T. Alghamdi, J. Bugshan, S. Manson and S. K. Raghupathula, "Complete power management system for an industrial refinery," 2015 IEEE Petroleum and Chemical Industry Committee Conference (PCIC), 2015.

Z. Li, M. Shahidehpour, F. Aminifar, A. Alabdulwahab and Y. Al-Turki, "Networked Microgrids for Enhancing the Power System Resilience," in Proceedings of the IEEE, vol. 105, No. 7, pp. 1289-1310, Jul. 2017.

M. Shahidehpour, Z. Li, S. Bahramirad, Z. Li and W. Tian, "Networked Microgrids: Exploring the Possibilities of the IIT-Bronzeville Grid," in IEEE Power and Energy Magazine, vol. 15, No. 4, pp. 63-71, Jul.-Aug. 2017.

E. Harmon, U. Ozgur, M. H. Cintuglu, R. De Azevedo, K. Akkaya and O. A. Mohammed, "The Internet of Microgrids: A Cloud-Based Framework for Wide Area Networked Microgrids," in IEEE Transactions on Industrial Informatics, vol. 14, No. 3, pp. 1262-1274, Mar. 2018.

Haibo You, V. Vittal and Zhong Yang, "Self-healing in power systems: an approach using islanding and rate of frequency decline-based load shedding," in IEEE Transactions on Power Systems, vol. 18, No. 1, pp. 174-181, Feb. 2003.

F. Katiraei, C. Abbey, S. Tang, and M. Gauthier, "Planned islanding on rural feeders—utility perspective," 2008 IEEE Power and Energy

(56) References Cited

OTHER PUBLICATIONS

Society General Meeting—Conversion and Delivery of Electrical Energy in the 21st Century, 2008.
B. Jeon and J. Na, "A study of cyber security policy in industrial control system using data diodes," 2016 18th International Conference on Advanced Communication Technology (ICACT), 2016, pp. 314-317.

* cited by examiner

Figure 2B

| P_G1 | P_G2 | P_PV | P_BY | P_L1 | P_L2 | P_PC | BEL | F | B1 | B2 | B3 | B4 | B5 | B6 | B7 |

Figure 2C

| B1O | B1C | B2O | B2C | B5O | B5C | B6O | B6C | B7O | B7C | BC | BD | PG1S | PG2S | MP | MQ |

CYBERSECURITY IN ELECTRIC POWER SYSTEMS

TECHNICAL FIELD

This disclosure relates to systems, devices, and methods for improving cybersecurity in industrial systems. More particularly, but not exclusively, this disclosure relates to managing cybersecurity in electric power systems.

BRIEF DESCRIPTION OF THE DRAWINGS

Non-limiting and non-exhaustive embodiments of the disclosure are described, including various embodiments of the disclosure with reference to the figures, in which:

FIG. 2B illustrates a Non-Routable Fixed Format (NRFF) data packet that a local controller may send to an external controller consistent with embodiments of the present disclosure.

FIG. 2C illustrates another non-routable fixed format data packet that the external controller may send to the local controller consistent with embodiments of the present disclosure.

DETAILED DESCRIPTION

Figure 1:
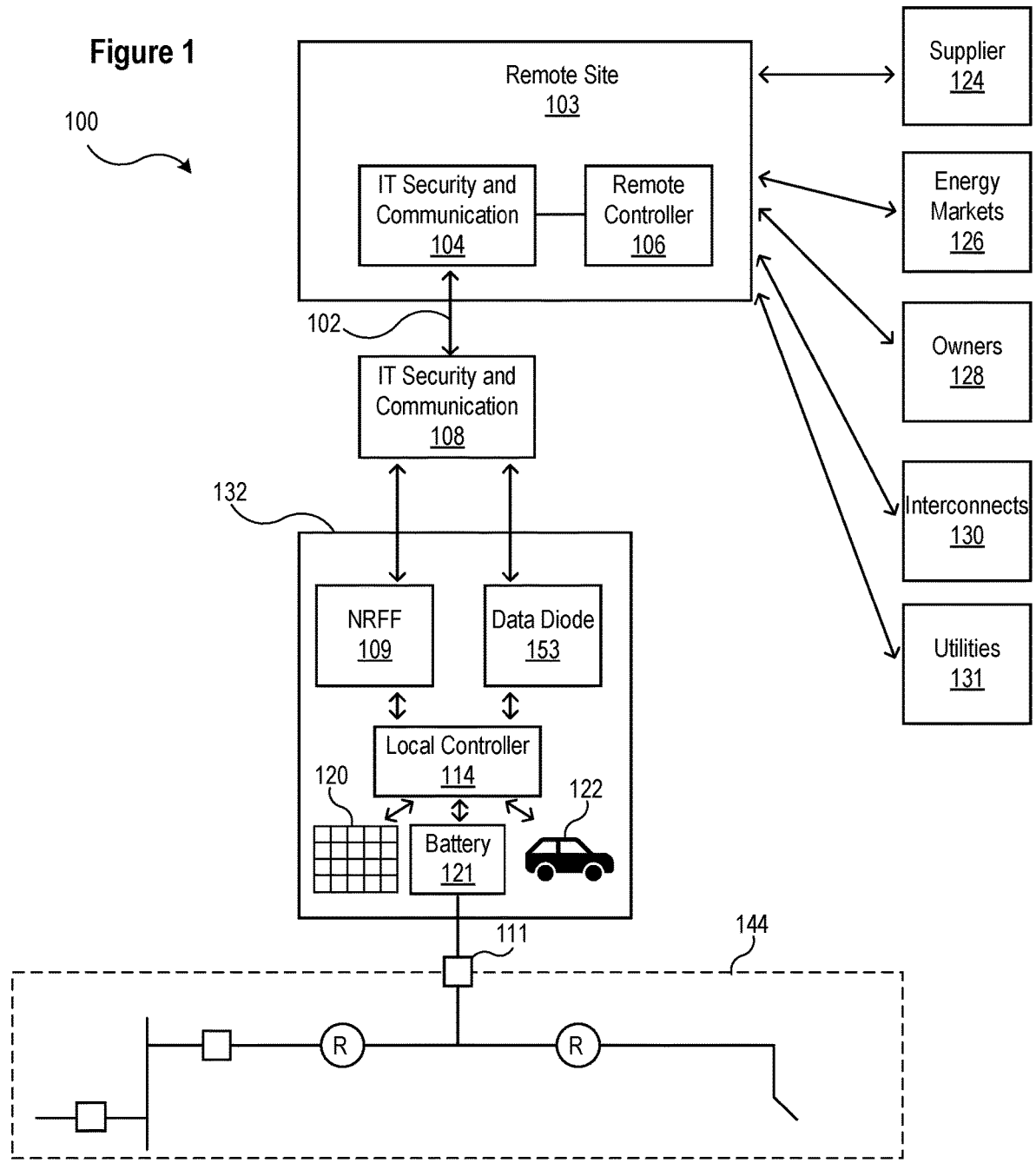
FIG. 1 shows an architecture for control of an electric power system consistent with embodiments of the present disclosure.

A wide-area electric power system may include microgrids that include generation, load, and power lines. Microgrids may be interconnected or operated separately (islanded) from the wide-area electric power system. As used herein, a microgrid is a set of controllable assets grouped for shared electrical control. Microgrids may vary dramatically in size and complexity.

Coordination of the operation of microgrids may provide a variety of benefits, (e.g., the ability to receive or transmit power from other microgrids, economic benefits, etc.); however, such coordination can present a potential vulnerability. Coordination of microgrids may involve coordinated action to increase generation or decrease load. Coordinating such action involves communication among the microgrids, and thus presents a potential target for a cyberattack.

Cyberattacks may take a variety of forms. For example, an attacker may compromise the availability of resources by deactivating equipment (e.g., turning off generators or inverter-based resources (IBR)), disconnecting portions of the microgrid (e.g., selectively disconnecting loads or customers), disconnecting the microgrid from the wide-area electric power system, etc. An attacker may also seek to compromise the integrity of the microgrid by manipulating data to cause control systems to operate incorrectly. An attacker may also misappropriate data to gain financial advantages. Finally, an attacker may seek to damage the microgrid devices or equipment to render the microgrid non-operational.

In various embodiments of the present disclosure, the present invention is a cybersecure system that provides a defined level of performance, independent of any cybersecurity attack. The level of performance is adjustable. The present invention enables the asset owners and power system planners to balance cybersecurity defense vs. cost (in terms of safety, reliability, or economics) of that cybersecurity defense.

The embodiments of the present disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer-executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

FIG. 1 shows an architecture for control of electric power systems consistent with embodiments of the present disclosure. FIG. 1 shows a microgrid 132 connected to a bulk power system 144 through breaker 111. In this example, the microgrid 132 includes a photovoltaic solar array 120, battery 121, and electric vehicle 122. The microgrid may incorporate these or other elements and may also include power lines, breakers, switches, transformers, synchronous generators, poles, communication equipment and many other assets as needed and as well understood in the state-of-the-art for microgrid assets and systems.

Although a single microgrid, 132, is illustrated, one of skill in the art will recognize that the principles may be applied to multiple microgrids and to electric power systems of significantly greater complexity. In some embodiments, a network 102 may comprise an Internet-based network, which presents one of the most challenging situations for cybersecurity compared to, for example, a physically dedicated communication link. While the flexible connectivity of an Internet-based network provides advantages, the attack profile is also increased. Although certain examples described herein are related to Internet-based networks, the principles disclosed herein may be applied to other types of network and remote control systems.

Control of system 100 may be divided between controllers 106 and 114. Controller 106 is connected via network 102 and interfaces with third-party entities such as the supplier 124, energy markets 126, owners 128, interconnects 130, and utilities 131. Owners 128 may own assets connected in system 132 or 144; or may be customers with loads that receive power from system 132 or 144. Interconnects 130 may permit system 100 or 144 to connect to other electrical systems and to import (buy) or export (sell) power. Utilities 131 receive data and send control signals to manage their overall power system.

IT security and communication 104 and 108 are representative of modern software cybersecurity best practices related to networking and communications. The IT security and communication functions 104 and 108 are connected to each other through Network 102. Also, IT security and communication 108 is connected to the Local Controller 114 via a Non-Routable Fixed Format data stream 109 (for communication from Remote Site 103 to microgrid 132) and Data Diode 153 (for communication from microgrid 132 to Remote Site 103), in FIG. 1. The IT security and communication also may connect to other functions within a software environment as is common for modern software cybersecurity best practices. This level of detail is not shown in FIG. 1.

IT security and communication 104 and 108 may enforce security policies related to communications between network 102 and components associated with microgrid electric power system 132. A variety of types of communications may be exchanged between network 102 and microgrid electric power system 132. Such communications may include both measurements of electrical conditions and control information associated with microgrid electric power system 132.

Cyberattacks against microgrid electric power system 132 may focus on network 102, IT security and communication 104, IT security and communication 108, NRFF data stream 109, or other components of system 100. The NRFF 109 may be a communication mechanism between from the IT security and communication 108 function to the Local Controller 114. The NRFF 109 is constructed to ensure that only specifically restricted data and command formats are received by the Local Controller 114. For example, there is no physical mechanism that allows generic information or commands to be communicated to the Local Controller 114.

Cyberattack attempts can encompass bad data injection or denial of service; trojan horses, malware, and viruses; malicious modification of algorithms running at the local controller; or malicious attacks resulting in maloperation or even destruction of components within microgrid electric power system 132. Communication link 102 may be implemented using various techniques to improve the cybersecurity of system 100. For example, with encrypted channels.

The local controller 114 is authoritative, and any communication from controller 106 may be treated as an untrusted stream of communications. The untrusted stream of communications received by local controller 114 may be treated as requests for certain actions that may be implemented only after controller 114 evaluates the request and confirms that it comports with all applicable policies enforced by controller 114 to achieve a defined minimum level of reliability, safety, and economics.

Similarly, measurements received by controller 114 via communication link 110 may be treated as untrusted. By treating such communications as untrusted, controller 114 reduces the risk of cybersecurity attacks, while still benefitting from external system information. For example, controller 114 may receive and use communications from controller 106 during typical operation and may block or entirely disregard communications from controller 106 if acting upon the communicated information would result in actions that violate a defined minimum level of reliability, safety, or economics, as enforced by controller 114

The microgrid electric power system 132 is both an electrical and cybersecurity fence. Electrically, the microgrid electric power system 132 interfaces with the external power system 100 through one (or more) points of interconnection 111. Microgrid electrical interconnection and the properties of points of interconnection are well-known in the field of electrical engineering.

For cybersecurity, the microgrid electric power system 132 interfaces with external communication networks through a single point of communication at the interface to the IT security and communication 108 function. The IT security and communication 108 may be located on the physical premises of the microgrid electric power system 132 and therefore benefits from a certain level of security due to physical proximity. However, the Local Controller 114 does not rely on the IT security and communication 108 for achieving its defined minimum level of reliability, safety, and economics when the system is under a cyberattack.

The upstream path from the Local Controller 114 to the Remote Site 103 is processed with a Data Diode 153. The Data Diode 153 physically ensures that communication from the Local Controller 114 to IT security and communication 108 includes no possibility of a hidden alternate path from IT security and communication 108 back to Local Controller 114 through the downstream path. A data diode as is well-known in the art.

The types of communication transmitted as NRFF data is limited in some embodiments. In one specific embodiment, the NRFF may comprise SEL Mirrored Bits developed by Schweitzer Engineering Laboratories, Inc., of Pullman, Washington.

The Local Controller 114 may be responsible for achieving a defined minimum level of reliability, safety, and economics for the microgrid electric power system 132. By receiving and acting upon untrusted data and command requests via the NRFF 109, it is possible for the Local Controller 114 to achieve a higher than minimum level of reliability, safety, and economics. The data received by Local Controller 114 is physically stored, via NRFF 109 in a data memory space.

System 100 may be capable of wide-area, hierarchical, distributed, or centralized methods for control and communication, which may increase performance optimality of the overall power system; however, systems consistent with the present disclosure may include a local controller as the authority for all control actions. As such, requests for control actions and/or data received from a remote controller may be selectively discarded by the local controller.

Figure 2A:
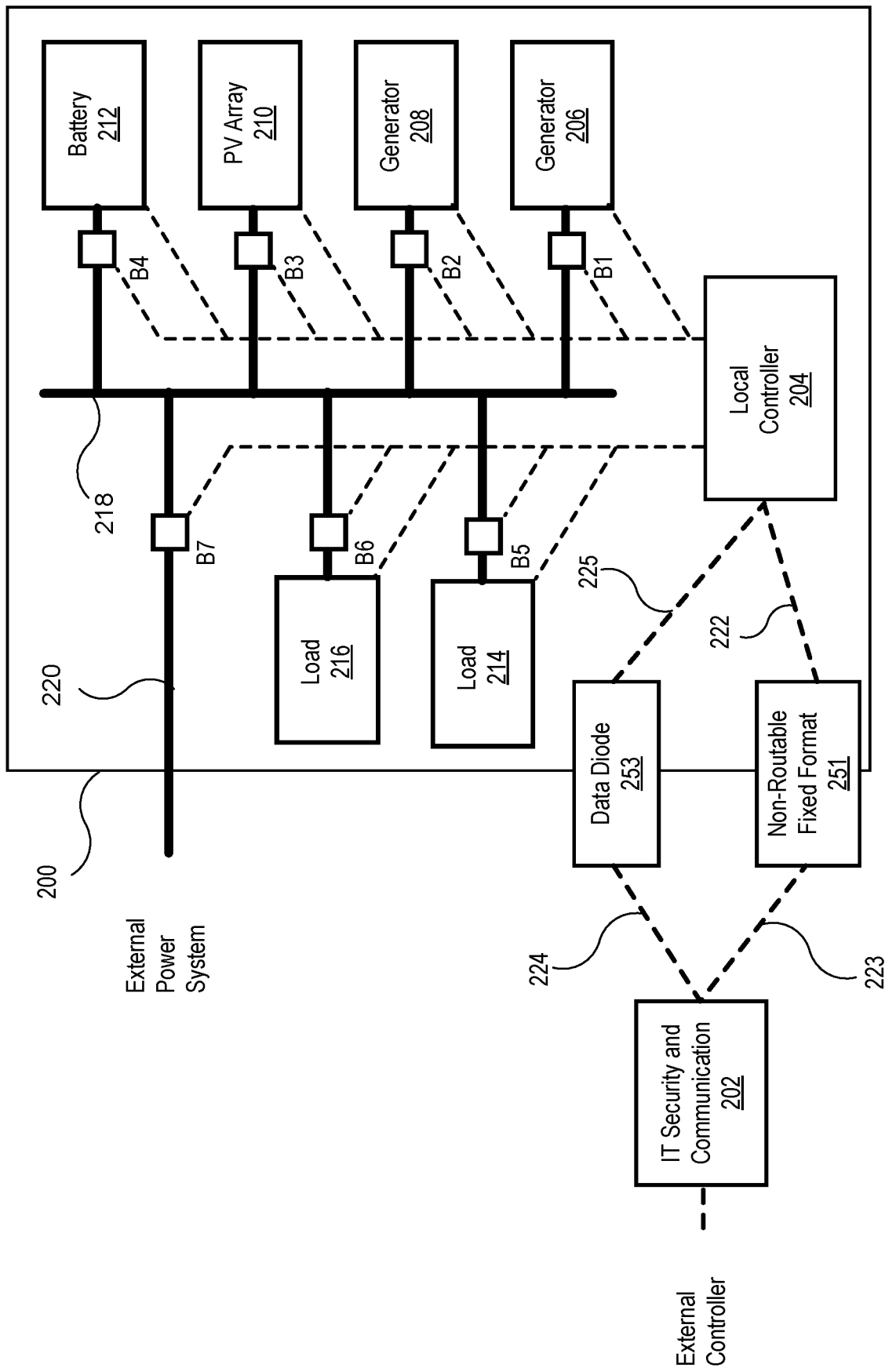
FIG. 2A shows an architecture for control of an electric power system consistent with embodiments of the present disclosure.

FIG. 2A shows an architecture for control of a microgrid system 200 consistent with embodiments of the present disclosure. In the illustrated embodiment, thick lines 218 represent electrical connections for providing electrical power, and dashed lines represent bidirectional communication and control signals. Microgrid system 200 includes generators 206, 208 that may generate electrical power from various sources. A photovoltaic (PV) array 210 may also generate power from solar energy. A battery 212 may provide energy storage when microgrid system 200 produces excess electrical power and may be a source of electrical power when demand in microgrid system 200 exceeds generation. Generators 206, 208, PV array 210, and battery 212 may represent single assets, or may represent classes of assets in a large system. For example, generator 206 may represent a combined-cycle power plant, and generator 208 may represent a hydroelectric power source. Each of generators 206, 208, PV array 210, battery 212, and breakers (B1, B2, B3, B4, B5, B7, B7) may be in communication with and receive control actions and/or commands from local controller 204 using a variety of communication methods such as Ethernet or wireless links. These communication links are shown with dashed lines. Not all microgrid electrical equipment and assets are shown in FIG. 2A. For example, transformers, switches, poles, towers, communication cables, protective relays, communication processors, and individual control devices are not shown. Also, as is well-known, the electrical equipment is with three-phase connections and this is represented as single (thick) lines in FIG. 2A.

The various power sources in microgrid system 200 may supply power to loads 214, 216. Loads 214, 216 may represent discrete components or may represent categories (e.g., load 214 may represent residential customers and load 216 may represent commercial customers).

A point of common coupling 220 through breaker B7 may allow microgrid system 200 to connect to an external power system from which electrical energy may be imported (purchased) or to which electrical energy may be exported (sold).

Each element of microgrid system 200 may be connected to a bus, distribution line, or transmission line (218 represents any of these options) through breakers (labeled B1-B7) that are in communication with local controller 204. Local Controller 204 may selectively connect or disconnect each element by issuing commands to an associated breaker.

The Local Controller 204 sends data and messages to the External Controller through Data Diode 253 via paths 225 and 224. The Local Controller 204 receives data and command requests from External Controller through NRFF 251 via paths 223 and 222. With respect to FIG. 1, the External Controller is synonymous with the Remote Controller 106 at Remote Site 103 connected with communication link 102.

FIG. 2B illustrates data that the local controller 204 of FIG. 2A may send to an external controller consistent with embodiments of the present disclosure. As discussed above, the use of a data diode physically eliminates the possibility that an upstream path can be maliciously converted into a downstream path. The data may include the following measurement data fields.

P_G1=Power from Generator 206,
P_G2=Power from Generator 208,
P_PV=Power from PV array 210,
P_BY=Power output from battery 212,
P_L1=Power at load 214,
P_L2=Power at load 216,
P_PC=Power at the point of common coupling 220,
BEL=Battery 212 energy level,
F=Microgrid frequency, and
B1, B2, B3, B4, B5, B6, B7=State of breakers.

Various types of representations may be used to quantify the measurement values. In one example, the power, battery energy level, and frequency values are each represented by two bytes, in twos-compliment format. The values may be normalized for representation between −1 and +1. Breaker states may be represented as either a zero (0) or a one (1).

FIG. 2C illustrates a non-routable fixed format data packet, received by the Local Controller 204 via path 222, based on data that an external controller may send to the local controller through NRFF 251 via 223, consistent with embodiments of the present disclosure. The IT security and communication 202 takes command requests received over the network from External Controller and transforms them into the NRFF data types shown in FIG. 2C. Similar to the packet illustrated in FIG. 2B, the specific packet fields may be determined by the equipment in an associated system. As one of skill in the art will appreciate, a wide variety of data may be transmitted in various embodiments. In the specifically illustrated embodiment, which is merely one example, the non-routable fixed format data packet shown in FIG. 2C include the following data fields:

B1O=A requested command to open breaker 1,
B1C=A requested command to close breaker 1,
B2O=A requested command to open breaker 2,
B2C=A requested command to close breaker 2,
B5O=A requested command to open breaker 5,
B5C=A requested command to close breaker 5,
B6O=A requested command to open breaker 6,
B6C=A requested command to close breaker 6,
B7O=A requested command to open breaker 7, B7C=A requested command to close breaker 7,
BC=Charge the battery 212,
BD=Discharge the battery 212,
PG1S=Set-point for power output from generator 206,
PG2S=Set-point for power output from generator 208,
MP=Microgrid requested power output, and
MQ=Microgrid requested reactive power output.

Again, various types of representations may be used to quantify the measurement values. Breaker open and close command requests, and the battery charge and discharge command may be represented by two bytes, with two valid values each. Any values other than the valid values may be discarded. The set-point requests (i.e., PG1S, PG2S, and MP) may be each represented by two bytes, in unsigned format and in a per-unit representation. The value 0x0000 indicates that no set-point command request is being sent. The value 0x0001 is the lowest set-point request and the value 0xFFFF is a +1 per-unit set-point request. The set-point request MQ may be represented by two signed bytes. The value 0x0000 indicates that no set-point command request is being sent. The value 0xFFFF is −1 per-unit and the value 0x7FFF is +1 per-unit. The total size of command requests from the remote controller in this example is 32 bytes and other representations are possible.

In one embodiment, SEL Mirrored Bits may be used to communicate the data along 222 using one or more serial cables between NRFF 251 output and Local Controller 204 input. The serial packet comprises a header followed by fixed format data fields. While an attacker could attack the IT security and communication 202, and from there change the values sent to the local controller 204 over the serial communication, an attacker cannot use the serial communication to modify local controller 204 functionality because there is no execution path for serial data. In other words, there is no remote code execution path, or RCE for serial data received via 222. In view of the lack of a remote code execution path, an attacker cannot install or modify software or malware on local controller 204 even if the attacker remotely compromises IT security and communication 202.

In one specific example, microgrid system 200 may be configured to export 100 MW to the external power system. An untrusted request may be communicated to local controller 204 via NRFF path 223 from IT security and communication 202 to adjust the generation of microgrid system 200 to export 110 MW. Local controller 204 may evaluate this request with respect to local safety, reliability, and economics. If the local controller 204 decides that 110 MW can be delivered without any compromise of these considerations, then local controller 204 may issue commands to generator 206, generator 208, and/or battery 212 to increase power output from 100 MW to 110 MW. In another example, an attacker may issue a command to change the power output from 100 MW to 0 MW. Local controller 204 may be configured to ignore such a request based on various factors (e.g., maintaining power to critical loads, contractual arrangements, etc.). For example, a pre-defined contractual arrangement may specify that changes in power output must be within +/−10%.

Local controller 204 may be configured to comply with various constraints that may impede an attacker who gains access to IT security and communication 202. For example, a control algorithm implemented by local controller 204 may allow only changes of up to +/−10% in output power based on an untrusted request. In another example, the frequency of changes may be restricted (e.g., only one change may be requested every 15 minutes). Further, safety and reliability may be assessed in connection with all untrusted requests received by local controller 204, and an untrusted request may be discarded if it would cause an economic, safety or reliability issue within the microgrid.

In another example, the operator of microgrid system 200 may take generator 206 out of service for testing on a planned date in the future and may desire to remotely close breaker B1 to reconnect generator 206 after completion of the testing. The data fields B1C (command to close breaker 1) and PG1S (set-point for power output from generator 206) are associated with this task. When generator 206 is brought back online, local controller 204 may utilize locally available information. Such information may include whether a lock-out signal is received, whether the lock-out signal was de-asserted, whether an on-site command is received to enable generator 206 to be put back into service, and whether system reliability is impacted by putting generator 206 back into service. If all locally-available information confirms the untrusted request to close B1 and to change the set point of generator 206, local controller 204 may return generator 206 to service. If the local information does not confirm the untrusted request, the request may be discarded.

Figure 3:
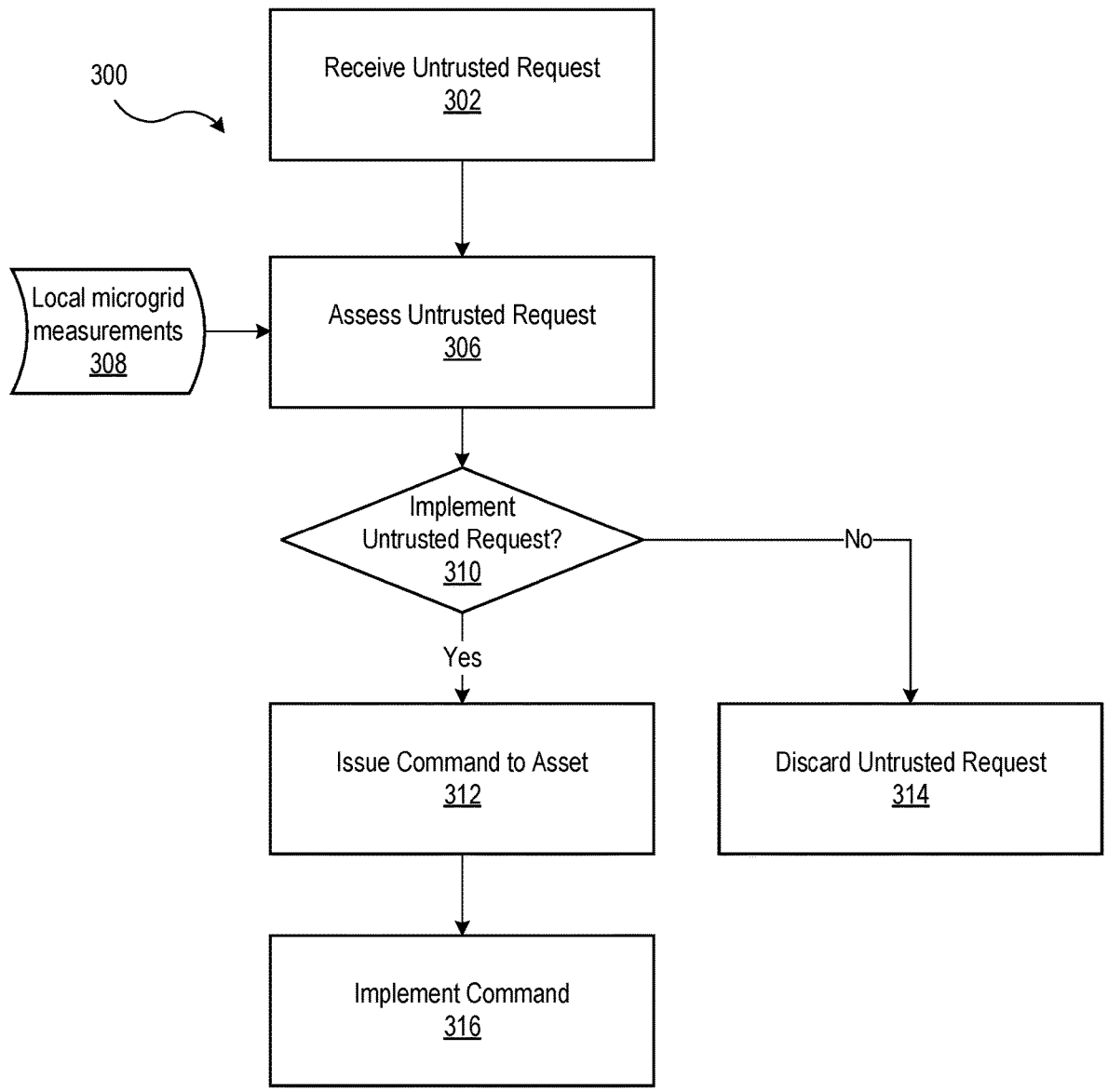
FIG. 3 illustrates a method of processing an untrusted request that may be implemented by a local controller consistent with the present disclosure.

FIG. 3 illustrates a method 300 of processing an untrusted request that may be implemented by a local controller consistent with the present disclosure. At 302, a local controller may receive an untrusted request.

At 306, the controller may receive both the untrusted request and measurements of electrical conductions from the local microgrid. Based on the local microgrid measurements 308, the local controller may assess the untrusted request. The local controller may assess the request based on the local microgrid measurements and other information available to the local controller. Untrusted requests that are contrary to the policy of achieving a minimum defined level of reliability, safety, and economics, based on the local microgrid measurements may be rejected.

At 310, a system implementing method 300 may determine whether to implement the untrusted request based on the assessment of the untrusted request. In some embodiments, the untrusted request may be discarded at 314 if it is not implemented, while in other embodiments, the untrusted request may be logged, further untrusted requests may be restricted for a time, or other actions may be taken. A system implementing method 300 acts as the control authority. Such a system may evaluate the impact of the command considering the current operating condition of the microgrid. If the requested action may result in reliability and/or security issues for the microgrid, the system may ignore the request. For example, when a microgrid is designed to operate independently and automatically to serve some critical loads, if a requested command asks for opening a breaker that can cause shedding of the critical load, the control authority may ignore the request. For generator control, if the requested set point is outside of a safe operating region or if the power output increase required for achieving the set point may cause asset degradation, the request may be ignored. A request for increasing generation when a point-of-common-coupling (POCC) is open may be ignored. These examples are intended to demonstrate that a local control authority may be configured to reliably and securely operate the microgrid power system while receiving untrusted requests.

At 312, a command may be issued to an asset that corresponds to the untrusted request if the untrusted requested is implemented. The specific command and the equipment to which it is directed may depend on the nature of the untrusted request.

At 316, the command may be implemented by an asset. The command may include, for example, disconnecting a load, increasing generation, providing additional reactive power support, etc.

In some embodiments, it may be assumed, in the absence of a cyberattack, that a remote controller is sending the commands to the local controller that optimize the performance of a wide-area electric power system. If a local controller does not implement commands from the remote controller, the wide-area system and/or the microgrid associated with the local controller may perform sub-optimally.

As such, systems and methods consistent with the present disclosure offer a flexible approach that permits an operator to balance security and risk. For example, the operator of a microgrid may decide to always implement untrusted requests from a remote controller; however, such a decision may increase the risk of a cyberattack (although such an attack is limited in scope by the principles disclosed herein). Such a strategy may be beneficial if the potential harm from such a limited cyberattack is less than the sub-optimal performance associated with discarding such requests. Alternatively, an operator may determine that the harm caused by a cyberattack on any point of the system external the microgrid electric power system 132 is much greater than the harm caused by suboptimal performance and may configure a system to discard all untrusted requests and to base all actions on local microgrid measurements. Of course, a balanced strategy may also be employed by a grid operator to implement untrusted requests under certain conditions and to discard untrusted requests under other conditions. During times of heightened cyber risk, or during times when power system conditions dictate different levels of cyber risk versus the cost of suboptimal performance of the microgrid, the threshold can be adaptively varied.

Figure 4:
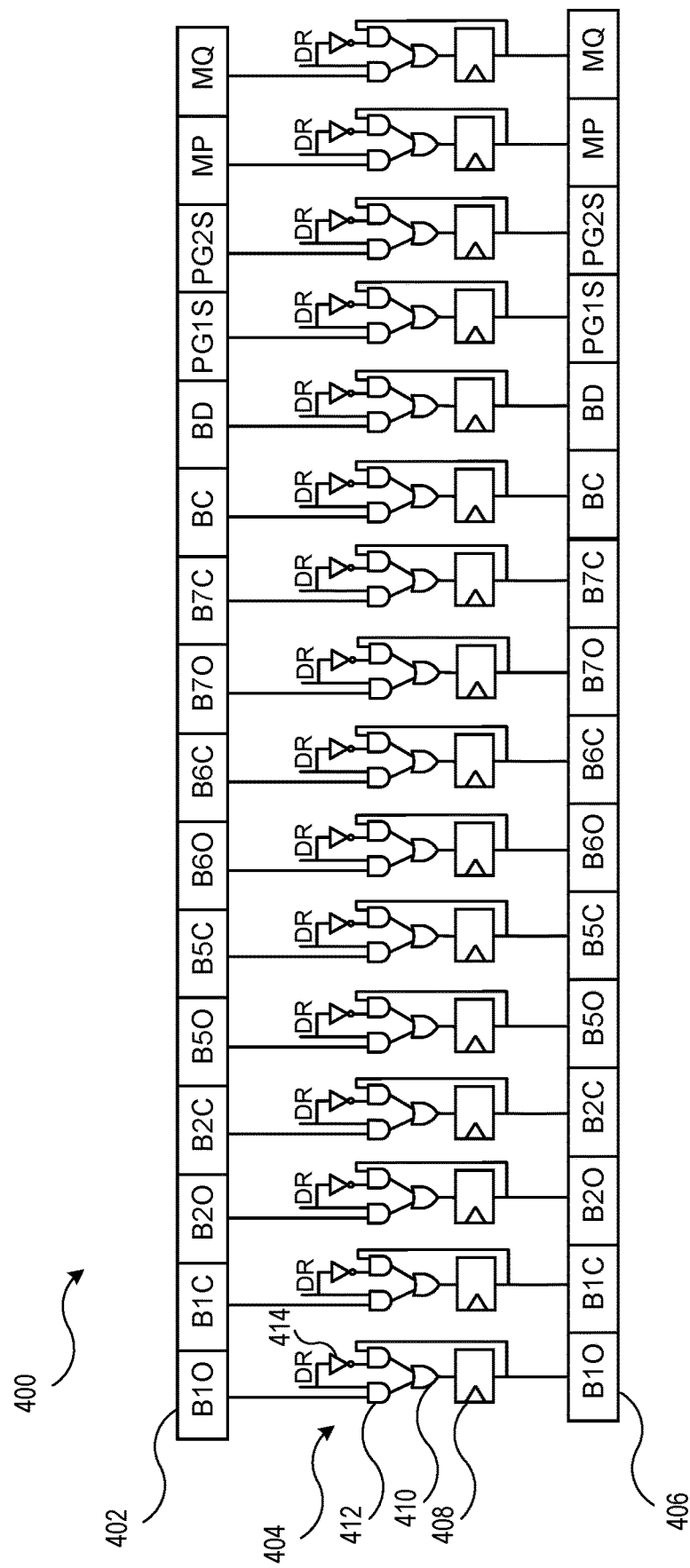
FIG. 4 illustrates a conceptual representation of a system to receive untrusted requests and communicate such requests to a local controller consistent with the present disclosure.

FIG. 4 illustrates a conceptual representation of a system 400 to receive untrusted data and communicate such data to a local controller consistent with the present disclosure, such as NRFF 109 or 251, shown in FIGS. 1 and 2, respectively. System 400 comprises discrete logic components. The logic components include flip-flops (408 is an example), logical OR gates (410 is an example), logical AND gates (412 is an example) and logical NOT gates (414 is an example). The logic components 408, 410, 412, and 414 are replicated for all connections between inputs 402 and outputs 406. The lines connecting inputs 402 and outputs 406 and the logic components may each be multiple bits wide. System 400 may receive a first set of fixed-format data values 402 from an untrusted source (e.g., a remote controller). A plurality of digital components 404 is provided for each data value. The plurality of digital components includes a multi-byte flip-flop to store the received data from the received data values 402 based on a data read (DR) signal from a local controller (not shown). When a new data value is not received, data is not stored.

The DR signal may be connected to a switch from a local controller that disables system 400. As may be appreciated, if the DR signal is inactivated, no data can pass through system 400. When no data is passing through system 400, a local controller may operate autonomously. The ability to isolate a system during a cyberattack permits a rapid response and fast recovery. This flexible architecture can provide significant benefit to the microgrid owners and operators considering cyber security and economics of the system.

The values stored by the multi-byte flip-flops may then be used to create a second set of fixed format data values 406. This configuration permits the transfer of data in only one direction. As such, it isolates a receiving device from communication of information except specifically defined data. Further, the transmitted values do not provide computing functions or permit access to an execution path of the receiving device. This is because data 406 is in the data memory space of the local controller processing 204. As such, a receiving device may benefit from external information without facing the risk of a cyberattack through the communication channel used to communicate the external information.

Figure 5:
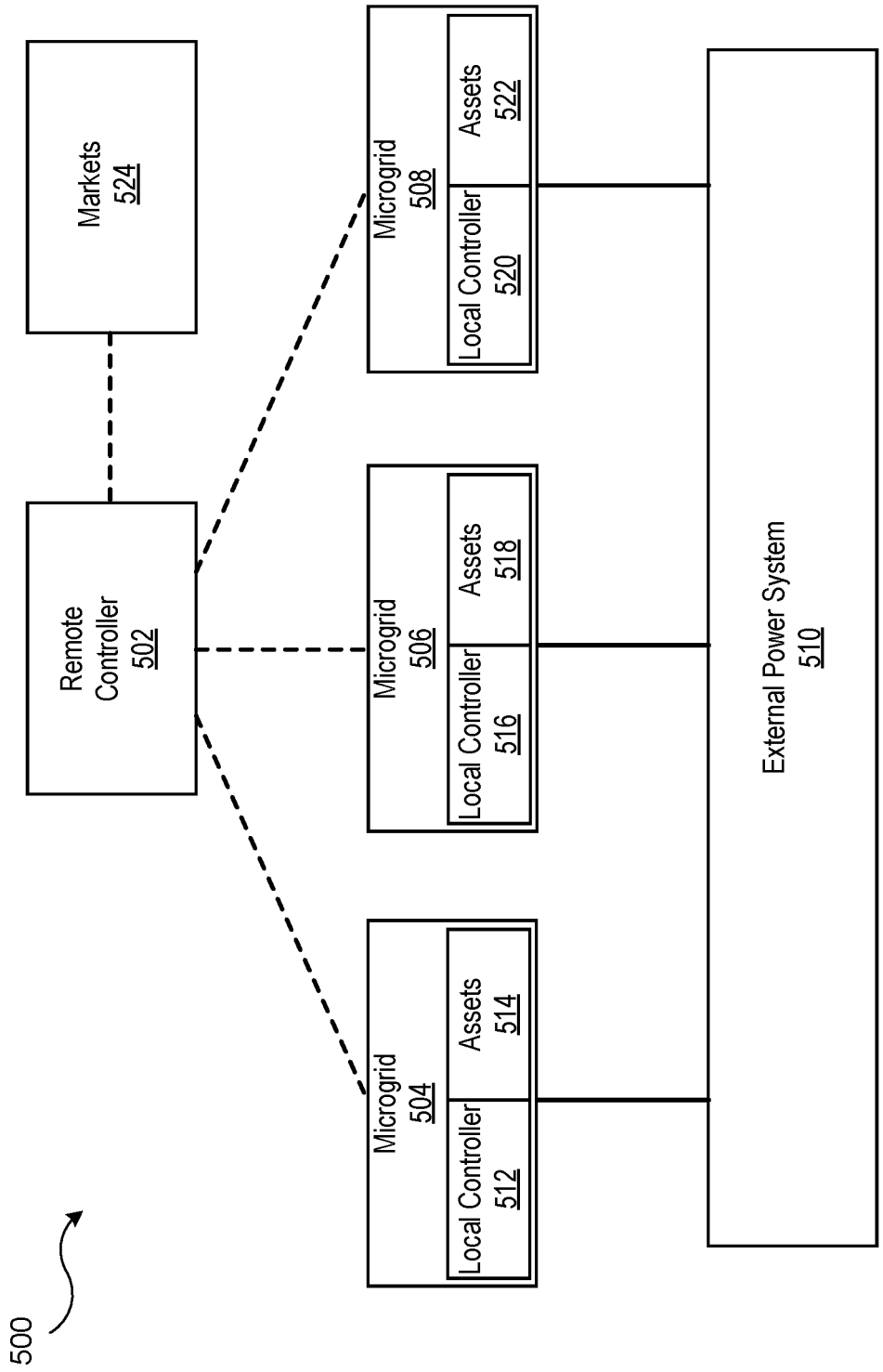
FIG. 5 illustrates a system including a remote controller in communication with a plurality of microgrids consistent with embodiments of the present disclosure.

FIG. 5 illustrates a system 500 including remote controller 502 in communication with a plurality of microgrids 504, 506, and 508 consistent with embodiments of the present disclosure. Each microgrid 504, 506, and 508 may include a local controller 512, 516, and 520, respectively. Each microgrid 504, 506, and 508 may also include assets 514, 518, and 522, respectively. Remote controller 502 may coordinate the activity of microgrids 504, 506, and 508 by transmitting command requests and measurements from external power system 510 to local controllers 512, 516, and 520. Each local controller, 512, 516, and 520 may evaluate the requests received from remote controller 502 and selectively implement or discard requests for action. Although system 500 includes three microgrids, any number of microgrids are included within the scope of the present disclosure. In some embodiments, communication from remote controller 502 to each local controller 512, 516, and 520 is conducted via a non-routable fixed format communication protocol. In one specific embodiment, the non-routable fixed format communication protocol is routed through a serial data connection.

The operators of microgrids 504, 506, and 508 may choose to operate in various ways. For example, the operators of microgrids 504, 506, and 508 may enter into contracts to supply grid services to an external power system 510 and receive compensation for such services via markets 524. Grid services can include load shaping, frequency support, voltage support, or power exchange. Remote controller 502 may run optimization algorithms to determine real and reactive power set-points for each microgrid 504, 506, and 508. Each local controller 512, 516, and 520 may receive requests from remote controller 502 and evaluate such requests based on the needs, reliability, and safety of each microgrid 504, 506, and 508. The local controllers 512, 516, and 520 may adjust output to meet the requests when possible, while maintaining authority of each microgrid 504, 506, and 508.

In another example, an operator may choose to normally operate the microgrid in an islanded mode. In such a case, remote controller 502 may only request grid services involving generator setpoint changes. In this case any other requests may be discarded. Further, local controller 512, 516, or 520 may perform necessary auto-synchronization for closing a POCC breaker, ramp up generators to satisfy constraints for reliability and security of the microgrid, and close the POCC breaker.

An operator of a microgrid may adjust responsiveness to requests from remote controller 502 over time. Such changes may be prompted based on financial incentives (e.g., additional compensation or penalties from markets 524), the need for additional security, etc.

Figure 6:
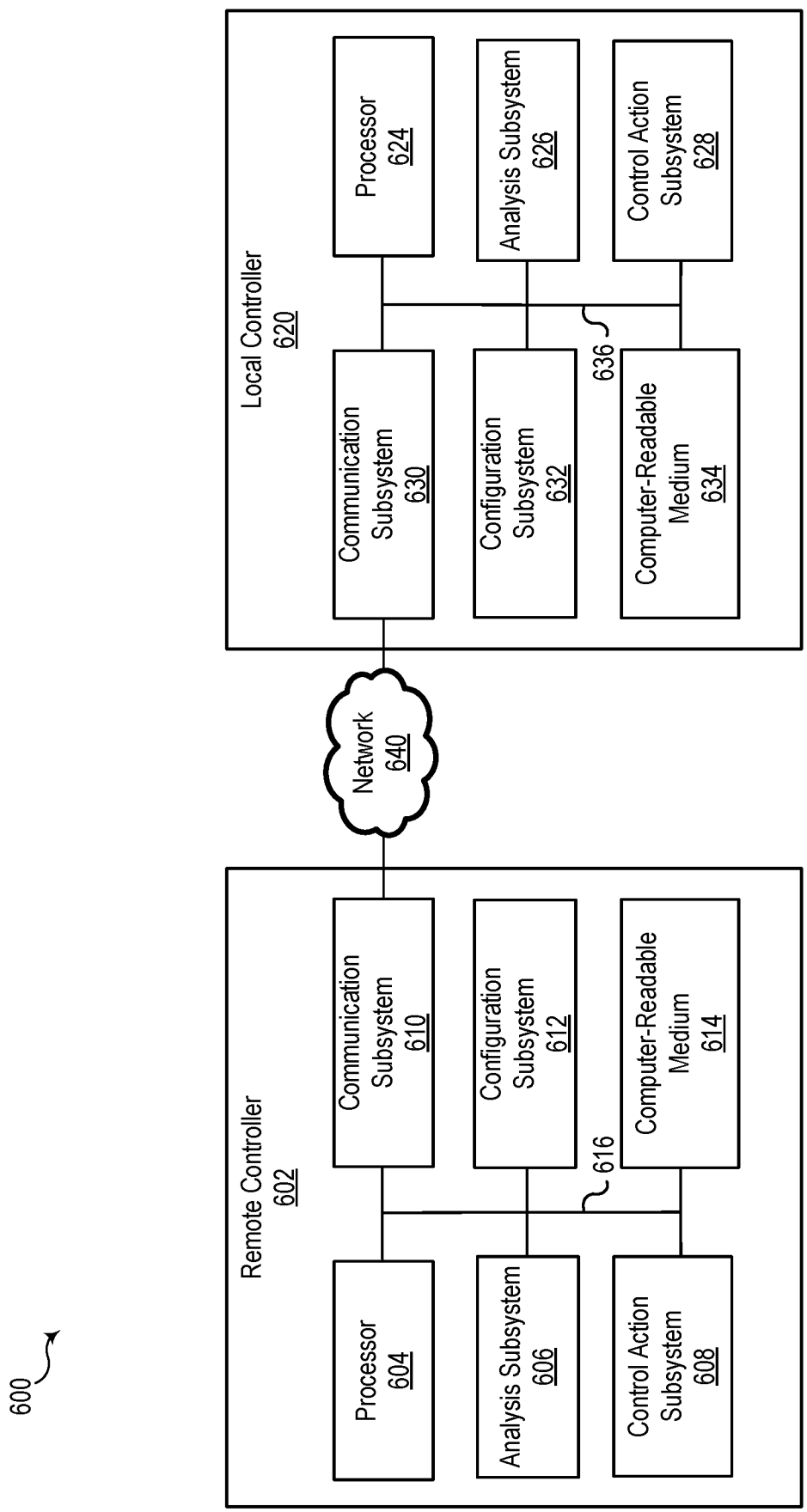
FIG. 6 illustrates a functional block diagram of a system comprising a remote controller and a local controller connected via a network consistent with embodiments of the present disclosure.

FIG. 6 illustrates a functional block diagram of a system 600 comprising a remote controller 602 and a local controller 620 connected via a network 640 consistent with embodiments of the present disclosure. Remote controller 602 may be in communication with multiple local controllers, but a single local controller 620 is shown for simplicity. Remote controller 602 may coordinate the action of a wide-area electric power system, while local controller 620 may coordinate the activity of a microgrid. System 600 may be implemented using hardware, software, firmware, and/or any combination thereof. In some embodiments, remote controller 602 and/or local controller 620 may be embodied as an IED, a protective relay, or other type of device. Certain components or functions described herein may be associated with other devices or performed by other devices. The specifically illustrated configuration is merely representative of one embodiment consistent with the present disclosure.

Remote controller 602 and local controller 620 each include a communication subsystem 610 and 630, respectively, to communicate with each other and with other devices. In certain embodiments, an IT security and communication system (not shown) may be disposed between remote controller 602 and local controller 620 and network 640. In some embodiments, communication from network 640 to local controller 620 is conducted via a non-routable fixed format communication protocol. In one specific embodiment, the non-routable fixed format communication protocol is routed through a serial data connection.

Communication subsystems 610 and 630 may each receive data related to electrical conditions. Local controller 620 may receive data from IEDs, voltage or current sensors, merging units, or other devices in an associated microgrid. Local controller 620 may transmit data about electrical conditions in an associated microgrid to remote controller 602. In one specific embodiment, such information may be transmitted using a data diode and in a format similar to that shown in FIG. 2B. Remote controller 602 may transmit a plurality of requests for control actions. In one specific embodiment, such information may be transmitted using a non-routable fixed format communication protocol and in a format similar to that shown in FIG. 2C. Although not specifically illustrated in FIG. 6, communication subsystem 610 may also be configured to communicate with other types of systems. In one specific embodiment, communication subsystem 610 may support communications with the third-party systems (i.e., supplier 124, energy markets 126, owners 128, and interconnect 130) illustrated in FIG. 1.

Remote controller 602 and local controller 620 may each include a configuration subsystem 612 and 632, respectively. Configuration subsystems 612 and 632 may allow an operator to adjust a balance between security and coordination. An operator may adjust the conditions under which local controller 620 implements requests for control actions from remote controller 602 and the conditions under which local controller 620 discards such requests. As a result, local controller 620 selectively implements a subset of the plurality of requests for control actions from remote controller 602.

Processors 604 and 624 process information and implement algorithms executed by remote controller 602 and local controller 620, respectively. Processors 604 and 624 may operate using any number of processing rates and architectures. Processors 604 and 624 may perform various algorithms and calculations described herein. Processors 604 and 624 may each be embodied as a general-purpose integrated circuit, an application-specific integrated circuit, a field-programmable gate array, and/or any other suitable programmable logic device. Data buses 616 and 636 may provide connection between various components of remote controller 602 and local controller 620, respectively.

Instructions to be executed by processors 604 and 624 may be stored in computer-readable media 614 and 634, respectively. Computer-readable media 614 and 634 may comprise random access memory (RAM) and non-transitory storage. Computer-readable media 614 and 634 may be the repository of software modules configured to implement the functionality described herein.

Analysis subsystems 606 and 626 may analyze electrical conditions and identify control actions. Analysis subsystem 606 may seek to optimize operation of a plurality of microgrids across a wide-area electric power system. Analysis subsystem 626 may assess the safety, reliability, and economics or various actions as they relate to the operation of the specific microgrid associated with local controller 620. Analysis subsystem 626 may generate an assessment of the plurality of conditions in relation to the plurality of conditions related to electrical conditions in the microgrid and selectively implement a subset of the plurality of requests for control actions from the remote controller 602 based on the assessment.

Control action subsystems 608 and 628 may be configured to generate control actions directed toward specific assets. Control action subsystem 628 may generate control actions based on an assessment generated by analysis subsystem 626 for specific actions (e.g., actuate a breaker, change a generator setpoint, etc.) in a microgrid. Control action subsystem 608 may identify control actions to be implemented by assets within a particular microgrid and transmit a request for the identified control action to be implemented.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

The invention claimed is:

1. A local controller system configured for use in an electric power system, comprising:
   a measurement subsystem to receive a plurality of conditions related to electrical conditions in a microgrid;
   a communication subsystem to:
      transmit a set of data related to conditions in the microgrid to a remote controller using a data diode connected to the local controller system to allow the transfer of data in only one direction such that the data diode physically ensures that communication from the local controller system to the remote controller includes no possibility of a hidden alternate path back to the local controller system through a downstream path; and
      receive a plurality of requests in a non-routable fixed format for control actions from the remote controller;
   an analysis subsystem to:
      generate an assessment of the plurality of requests for control actions in relation to the plurality of conditions related to electrical conditions in the microgrid; and
      identify a subset of the plurality of requests for control actions from the remote controller for execution based on the assessment; and
   a control action subsystem to issue a control action to an asset in the microgrid corresponding to the subset of the plurality of requests for control actions from the remote controller.

2. The local controller system of claim 1, wherein the local controller is configured to treat the plurality of requests for control actions from the remote controller as an untrusted stream of requests.

3. The local controller system of claim 1, wherein the local controller system is configured to communicate with the remote controller via a non-routable communication protocol.

4. The local controller system of claim 3, wherein the non-routable communication protocol comprises a plurality of fixed format data values.

5. The local controller system of claim 4, wherein the non-routable communication protocol is configured to be transmitted via a serial data connection.

6. The local controller system of claim 1, wherein the communication subsystem is configured to interface with an IT security and communication device.

7. The local controller system of claim 6, wherein the IT security and communication device is configured to connect to the Internet.

8. The local controller system of claim 1, wherein the communication subsystem comprises a data diode.

9. The local controller system of claim 8, wherein the data diode comprises a plurality of logic gates coupled to a plurality of data storage elements.

10. The local controller system of claim 9, wherein the plurality of data storage elements comprises a disable feature accessible to an operator.

11. A method of controlling a microgrid using a local controller system, comprising:
    receiving, using a measurement subsystem, a plurality of conditions related to electrical conditions in a microgrid;
    transmitting, using a communication subsystem, a set of data related to conditions in the microgrid to a remote controller using a data diode connected to the local controller system to allow the transfer of data in only one direction such that the data diode physically ensures that communication from the local controller system to the remote controller includes no possibility of a hidden alternate path back to the local controller system through a downstream path;
    receiving, using the communication subsystem, a plurality of requests for control actions from the remote controller;
    generating, using an analysis subsystem, an assessment of the plurality of requests for control actions in relation to the plurality of conditions related to electrical conditions in the microgrid;
    identifying, using the analysis subsystem, a subset of the plurality of requests for control actions from the remote controller for execution based on the assessment; and
    selectively implementing, using a control action subsystem, a subset of the plurality of requests for control actions from the remote controller based on the assessment.

12. The method of claim 11, further comprising the local controller system treating the plurality of requests for control actions from the remote controller as an untrusted stream of requests.

13. The method of claim 11, further comprising communicating the set of data related to conditions in the microgrid to a remote controller and the plurality of requests for control actions from the remote controller using a non-routable communication protocol.

14. The method of claim 13, wherein the non-routable communication protocol comprises a plurality of fixed format data values.

15. The method of claim 14, further comprising transmitting the non-routable communication protocol via a serial data connection.

16. The method of claim 11, further comprising interfacing the communication subsystem with an IT security and communication device.

17. The method of claim 16, wherein the IT security and communication device is configured to connect to the Internet.

18. The method of claim 11, wherein the communication subsystem comprises a data diode.

19. The method of claim 18, wherein the data diode comprises a plurality of logic gates coupled to a plurality of data storage elements.

20. The method of claim 19, wherein the plurality of data storage elements comprises a disable feature accessible to an operator.

* * * * *